United States Patent
Pasciutti

[15] 3,663,941
[45] May 16, 1972

[54] DC TO AC TO DC CONVERTER HAVING TRANSISTOR SYNCHRONOUS RECTIFIERS

[72] Inventor: Edward R. Pasciutti, Beltsville, Md.

[73] Assignee: The United States of America as represented by the Administrator of the National Aeronautics and Space Administration

[22] Filed: Dec. 16, 1970

[21] Appl. No.: 98,640

[52] U.S. Cl. .................................. 321/2, 321/47, 331/113 A
[51] Int. Cl. ................................................ H02m 3/14, H03k
[58] Field of Search ................... 321/2, 46, 47; 331/113 A; 330/10; 329/50

[56] References Cited

UNITED STATES PATENTS 3,466,570  9/1969  Webb ................................... 321/2 X
3,430,125  2/1969  Povenmire et al. ................. 330/10 X

FOREIGN PATENTS OR APPLICATIONS 1,398,488  3/1965  France ................................. 321/2

OTHER PUBLICATIONS

Electronic Design, pp. 30, 63, June 21, 1963

Primary Examiner—William H. Beha, Jr.
Attorney—R. F. Kempf, Gerald M. Fisher and John R. Manning

[57] ABSTRACT

A DC to AC inverter including a pair of transistors driven in push-pull by means of coupling through first and second transformers, each having a saturable core, drives a DC load through a synchronous rectifier. The synchronous rectifier includes a pair of transistors, the emitter collector junctions of which are driven with the same waveshape as the emitter base junctions of the inverter. A circuit connecting the two transformers together includes a saturable reactor, whereby the base drive for the transistors of the inverter and the synchronous rectifier is a waveform having two relatively steep transitions in opposite directions at the moment of switch on to remove charge stored on the bases and a further relatively steep transition prior to cut off to minimize charge stored on the bases during conducting intervals of the transistors.

11 Claims, 6 Drawing Figures

INVENTOR,
EDWARD R. PASCIUTTI

BY Gerald M. Fisher

Attorneys

INVENTOR,
EDWARD R. PASCIUTTI

BY Gerald M. Fisher

Attorneys

DC TO AC TO DC CONVERTER HAVING TRANSISTOR SYNCHRONOUS RECTIFIERS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The present invention relates generally to DC to AC to DC converters and, more particularly, to such a converter wherein control electrodes of a synchronous rectifier employing transistor switches are driven with a replica of a waveform driving control electrodes of switching transistors of the DC to AC inverter.

PRIOR ART

In my U.S. Pat. No. 3,466,570 there is disclosed a DC to AC to DC converter employing a DC to AC inverter including a pair of switching transistors driven in push-pull. Output electrodes of the transistors are connected to primary windings of a first transformer having a saturable core and a secondary winding connected through a frequency determining network including a saturable reactor and inductor to a second transformer having a saturable core. Secondary windings of the second transformer drive base circuitry for the switching transistors in a push-pull manner. The particular advantage of utilizing a saturable reactor and inductor in the frequency determining circuit connecting the first or output transformer to the second or base drive transformer concerns the nature of the base drive current waveforms derived. The resulting waveform includes several relatively steep transitions occurring near the beginning and end of the transistor conduction interval. The transition occurring near the end of a transistor conducting interval acts to reduce the base drive current for the conducting transistor prior to switchover. When the base drive current for the conducting transistor is reduced to a nearly zero level, there is a reversal of the phase of the voltage across the inductor in the frequency determining circuit, whereby there is derived in the base drive transformer a steep voltage transition directed in the opposite direction from the voltage transition associated with the first-named current transition. The steep voltage transition overdrives the emitter base junctions of both the nonconducting transistor and the conducting transistor. The previously cut off transistor is quickly activated into a conducting state by the combined action of the normal regenerative feedback and the overdrive voltage and current provided by the stored inductive energy of the coupling network while the previously conducting transistor is turned off instantaneously by the overdrive voltage. The steep voltage transition of the waveform quickly returns to a lower level that maintains one of the transistors in its conducting state and the other transistor in its nonconducting state. These states are maintained until the saturable reactor in the coupling network is again saturated and the cycle is repeated for the opposite transistors.

In the circuit disclosed in the previously mentioned patent, voltages derived in a secondary winding of the first or output transformer are rectified to DC with a full wave rectifier including a pair of diodes. While the circuit functions satisfactorily, it is not sufficiently efficient for some purposes. In particular, for low DC load voltages the voltage drop across the rectifier is a significant percentage of the voltage developed across the load, whereby considerable voltage dissipation in the diode occurs, rather than in the load. Further, the $I^2R$ power dissipation in a two-electrode diode is appreciable, sufficiently great in many instances to require a heat sink to be associated with the diode.

Frequently the poor efficiency of two-electrode diodes has been counteracted through the use of low saturation resistance transistors connected as synchronous rectifiers. A typical arrangement for the synchronous rectifier transistors involves connecting the emitter collector circuits thereof in series between the output transformer and load, while connecting the base electrode in parallel with the output transformer circuitry. The base electrode can be connected directly to the output transformer or through suitable shaping circuitry. Shaping circuitry is often employed because charge built up between the base and output electrodes of the synchronous rectifiers often precludes rapid switching of the transistors from an on to an off state or vice versa. These networks, however, dissipate energy and thereby reduce efficiency.

Without the use of shaping circuits the transistors in prior art synchronous rectifiers frequently are conducting simultaneously, reducing efficiency and possibly causing overloads in the output transformer circuit. Overloads in the output transformer circuit are to be avoided because of the possible destructive effects. Short circuits also lead to the adverse effects of poor regulation and a relatively high level of ripple in the output waveform.

BRIEF DESCRIPTION OF THE INVENTION

In accordance with the present invention, these problems with the prior art are substantially reduced by employing a synchronous rectifier including a pair of transistors having their base circuits driven with the same waveform as the transistors of the d.c. to a.c. inverters. By driving the base circuit of the synchronous rectifier transistors with a waveform having the same characteristics as the waveform driving the base circuitry of the inverter transistors of my earlier mentioned patent, the same advantageous results, described supra with regard to the inverter transistors, occur in the synchronous rectifier transistors. In particular, the synchronous rectifier transistors are quickly driven from a conducting to a nonconducting state and vice versa in a nonoverlapping manner since stored base charge of the conducting transistor is minimized prior to cutoff, and the nonconducting transistor is quickly brought to conduction by the initially high level forward drive.

A feature of the invention involves the manner by which drive windings for the base collector junction of the synchronous rectifier transistors are connected to be responsive to the waveform generated by the inverter, whereby the rectifier transistors are driven in the inverted mode while they are cut off and are driven in the normal mode while they are conductive. Operating the conducting transistor in a normal mode provides the advantage of low saturation voltage. The nonconducting transistor operating in the inverted mode exhibits a lower leakage current than nonconducting transistors in a normal operating mode. Thus, in addition to assuring correct transistor operation, the inverted mode provides greater efficiency because of the inherently lower cutoff leakage current.

A further advantage of driving the base circuit for the rectifying transistors in response to energy coupled to the drive transformer for the switching transistors of the DC to AC inverter concerns the ease and highly efficient manner by which energy can be coupled optimumly to the base of the synchronous rectifier transistors. In particular, the bases of the synchronous rectifier transistors are connected to secondary windings coupled to the base drive for the switching transistors of the inverter. The secondary windings connected to the synchronous rectifier transistors are separate from the windings utilized to couple switching energy to the bases of the inverter switching transistors. Thereby, energy is coupled in a very efficient, almost lossless, manner to the bases of the synchronous rectifier transistors independently of the load requirements for the switching transistors of the DC to AC inverter. This is particularly advantageous in many instances because of the different impedance levels of the inverter and rectifier transistors. Of course, efficiency is extremely high because of transformer coupling, which is virtually dissipa- A further significant advantage of the present invention is that the ratio of collector current to base current for the synchronous rectifier transistors remains relatively constant despite varying load current requirements. The ratio remains constant because of the feedback arrangement between the output transformer of the inverter and the drive or input transformer thereof, resulting in current levels in the drive transformer being proportional to the load current. Since the current level in the drive transformer varies as a function of load current requirements, the current level applied to the base electrodes of the synchronous rectifier transistors is dependent upon the output current, maintaining the ratio of collector to base current of the synchronous rectifier transistor substantially constant. In most prior art arrangements the current applied to the base electrodes of synchronous rectifier transistors is relatively constant because it is derived from the output transformer. The base current is designed at an optimum level for a particular load level. As the load current deviates from the designed level, the base current for the synchronous rectifier transistor does not materially change, with resulting decreases in efficiency of the synchronous rectifier transistor. In the present invention, the ratio of synchronous rectifier transistor collector to base current is substantially constant by proper initial design of the turns ratio for windings on the output and drive transformers.

It is, accordingly, an object of the present invention to provide a new and improved DC to AC to DC converter.

Another object of the present invention is to provide a new and improved DC to AC to DC converter that is highly efficient, substantially precludes short circuits in current waveforms driving a load, has good regulation and a relatively low ripple factor.

Another object of the present invention is to provide a DC to AC to DC converter employing synchronous rectifier transistors which are activated at high speed in an efficient manner such that stored charge built up on base electrodes during the conducting period is proportionately reduced immediately prior to switching off, also an initial high level drive is provided to rapidly turn on the nonconducting transistor, resulting in an efficient and reliable nonoverlapping switchover transition.

Another object of the invention is to provide a new and improved DC to AC to DC converter employing a synchronous rectifier having a control current responsive to the current supplied thereby to a load.

Still another object of the invention is to provide a new and improved Dc to AC to DC converter employing a synchronous rectifier transistor network connected in such a manner as to minimize leakage currents and always positively assure cut off of each transistor during each cycle of a drive waveform.

The above and still further objects, features and advantages of the present invention will become apparent upon consideration of the following detailed description of several specific embodiments thereof, especially when taken in conjunction with the accompanying drawings.

DETAILED DESCRIPTION OF THE DRAWINGS

Figure 1:
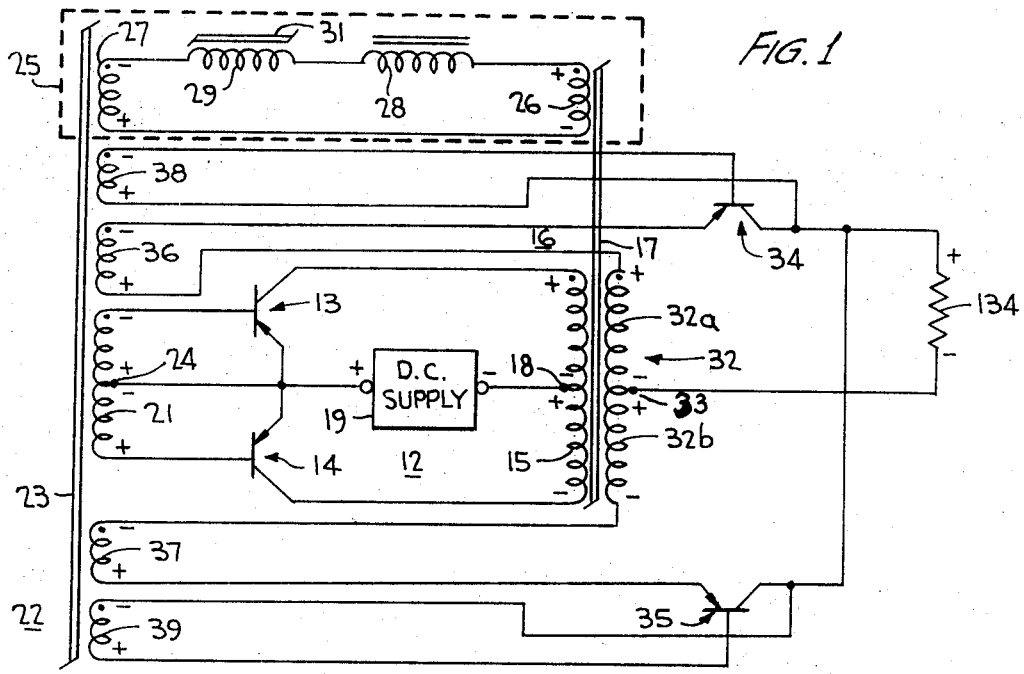
FIG. 1 is a circuit diagram of a preferred embodiment of the present invention.

Reference is now made specifically to the circuit diagram of FIG. 1 wherein static inverter 12 is illustrated as including a pair of push-pull switching transistors 13 and 14 of the PNP type. Collector electrodes of transistors 13 and 14 are connected to the opposite ends of primary winding 15 of transformer 16 which includes saturable core 17, preferably having a substantially rectangular hysteresis loop. Primary winding 15 is provided with a center tap 18 connected to a negative terminal of DC power supply 19. The positive terminal of DC power supply 19 is connected to a common terminal for the emitters of transistors 13 and 14. The emitter base junctions of transistors 13 and 14 are connected across center tapped secondary winding 21 of transformer 22 including saturable core 23, which also preferably has a substantially rectangular hysteresis loop. Center tap 24 of winding 21 is connected to the common terminal for the emitters of transistors 13 and 14, while the opposite ends of winding 21 are connected to the bases of transistors 13 and 14.

Coupling between output transformer 16 and drive or input transformer 22 is inductive via frequency determining circuit 25. Circuit 25 includes windings 26 and 27 respectively coupled to cores 17 and 23 of transformers 16 and 22. Windings 26 and 27 are connected with each other by the series connection of inductor 28 and saturable reactor 29, which includes core 31, preferably having a substantially rectangular hysteresis loop. Due to coupling of energy between output transformer 16 and drive or input transformer 22 via circuit 25, substantially square wave currents are generated in the collectors of transistors 13 and 14 during alternate half cycles of an oscillation period determined by the inverter switchover function of the frequency determining circuit 25, and the voltage of supply 19. The square wave oscillations are generated because of the relative directions of the turns of windings on transformers 16 and 22. The directions of turns are indicated by the dot convention as well as the plus and minus signs on the individual transformer windings, which indicate the polarity of voltages developed across the windings during the half cycle while transistor 13 is conducting.

Power developed in primary winding 15 of transformer 16 is coupled to output winding 32 having a center tap 33 connected to one terminal of load 134. Opposite ends of transformer winding 32 are connected to the emitters of PNP transistors 34 and 35 which function as synchronous rectifying switches. The connections between the opposite ends of winding 32 and the emitters of transistors 34 and 35 are via windings 36 and 37, respectively. Windings 36 and 37 are primary windings for transformer 22 and are energized by the current in winding segments 32a and 32b of winding 32 of transformer 16. Windings 36 and 37 can be thought of as primary windings of a current transformer including windings 21, 39, 38 and 27 as secondary windings.

To control switching of transistors 34 and 35 in synchronism with conduction or switching of transistors 13 and 14, the bases and collectors of the transistors are respectively connected across windings 38 and 39 of transformer 22. Windings 38 and 39 are wound in the same direction as windings 36 and 37 whereby the bases of transistors 34 and 35 are driven with out-of-phase voltages and thereby conduct during opposite half cycles. The turns ratio of the voltage transformers formed by windings 36-39 is selected to provide the optimum base drive for transistors 34 and 35. By connecting the base drive windings 38 and 39 between the bases and collectors of transistors 34 and 35, reduction of the leakage current of the nonconducting transistor is enhanced during the portion of each cycle while that transistor is cut off.

Power is delivered during alternate half cycles to load 134 through the emitter collector paths of transistors 34 and 35 by virtue of the common connection of the transistor collectors to the side of the load opposite from that connected to center tap 33. During one half cycle, transistors 13 and 34 simultaneously conduct whereby positive current flows from the upper end of winding 32 through the emitter collector path of transistor 34 through load 134 to center tap 33. During the alternate half cycle while transistors 14 and 35 are simultaneously biased to an on condition and transistors 13 and 34 are biased to an off condition, positive current flows from the lower end of winding 32 through the emitter collector path of transistor 35 through load 134 to center tap 33.

Figure 2A:
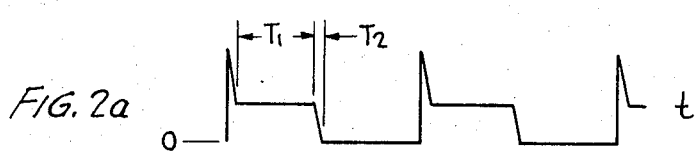
FIG. 2a and 2b illustrate drive current waveforms in the synchronous rectifier transistor bases in the circuit of FIG. 1.
Figure 2B:
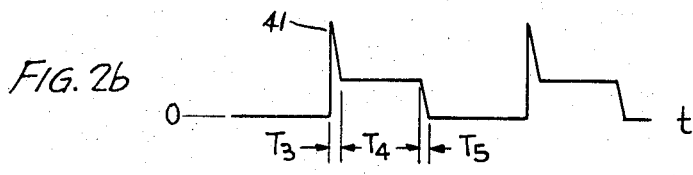

To provide a more complete understanding as to the manner by which synchronous rectifier transistor switches 34 and 35 function in a low dissipation reliable manner in synchronism with the switching of transistors 13 and 14 to feed nonoverlapping square wave current pulses of like polarity to load 134, consideration is given to the waveforms of FIGS. 2a and 2b. FIG. 2a illustrates replicas of the base current waveform of transistors 13 and 34, while FIG. 2b illustrates replicas of the base current waveform of transistors 14 and 35. It is noted that during alternate half cycles essentially zero base current flows in one pair of transistors while base current is being supplied to the other part of transistors to maintain them in a conducting state. While zero base current is flowing in one pair of transistors those transistors are cut off.

During the greatest portion of each half cycle while one pair of transistors is conducting, e.g., during the interval $T_1$, the core of saturable reactor 29 is not saturated and the current in network 25 is at a relatively low level. During interval $T_1$, one pair of transistors, such as transistors 13 and 34, is biased to an on or conducting state by virtue of the simultaneous coupling of energy from winding 36 to windings 38 and 21. For one particular transistor type, during the $T_1$ interval transistor 34 is saturated so that the emitter collector voltage drop is on the order of 0.1 volt. Simultaneously the collector base voltage drop resulting from the voltage developed across winding 38 is on the order of 0.6 volts so that the base is forward biased by approximately 0.7 volts over the emitter. At the completion of interval $T_1$, the core 31 of saturable reactor 29 becomes saturated, with a resulting drop in the current in windings 21 and 38, as indicated during the interval $T_2$. The decreased current level in windings 21 and 38 is accompanied by a reduction in the base current of transistors 13 and 34. At the completion of interval $T_2$, zero base current is flowing in transistors 13 and 34 so that collector current in the transistors is essentially cut off. At the time that the base current reaches zero, a voltage spike is developed across winding 27 due to the energy storage properties of inductance 28 and saturable reactor 29 in the frequency determining loop as explained in my earlier mentioned patent.

The voltage spike across winding 27 is coupled to the bases of transistors 14 and 35 as a current spike 41 at the beginning of an interval $T_3$. Current spike 41 is of sufficient amplitude to overdrive transistors 14 and 35 and actuate them quickly into a conducting state. The level of current supplied to the bases of transistors 14 and 35 decreases during interval $T_3$ to a lower, substantially constant value which is maintained during the interval $T_4$ for the majority of the half cycle while transistors 14 and 35 are conducting.

At the completion of interval $T_4$, core 31 of saturable reactor 29 again reaches a saturation level resulting in a reduction of the base current in the conducting transistors, i.e., transistors 14 and 35, during the interval $T_5$. By reducing the base current level of transistors 14 and 35 prior to cut off thereof the amount of charge accumulated on the bases thereof is less than would be the case if the transistors were driven sharply to cut off in response to the waveform developed in output transformer 32. Upon the completion of interval $T_5$, a further voltage spike is generated across winding 27 to activate transistors 13 and 34 into a conducting state and the cycle proceeds in the manner described supra.

During the period from the beginning of interval $T_3$ to the end of interval $T_5$ transistor 34 is operated in the inverted mode, i.e., the voltage between the emitter and collector of transistor 34 is reversed in polarity relative to the direction during the normal mode. During the normal mode for a PNP transistor there is a voltage drop from emitter to collector, but in the inverted mode there is a voltage drop from collector to emitter. During the inverted mode the emitter and collector reverse functions, whereby the physical collector effectively performs electrically in a manner similar to a normal emitter and vice versa for the physical emitter. Operation of transistor 34 in the inverter mode during the period from the beginning of $T_3$ to the end of $T_5$ results in a lower collector emitter leakage current than during normal mode cut off operation. This is particularly important in the present instances because the voltage across transistor 34 during the period while it is cut off is relatively high so that there is less dissipation than if the transistor were operated in the normal mode during this interval. Operation of transistor 34 in the inverted mode during the cut off interval occurs because of the biases applied to the various electrodes from $T_3$ to the end of $T_5$. In particular, the collector emitter voltage drop is essentially twice the voltage across load resistor 134 because of the series aiding relationship between the equal voltage drops across the load resistor and winding segment 32c and the virtually negligible voltage across winding 36. In addition, the polarity of the voltage applied by winding 38 between the base and physical collector, which effectively functions as an emitter in the inverted mode, back biases transistor 34 to cut off, whereby all of the requirements for inverted transistor mode operation are achieved.

Figure 3:
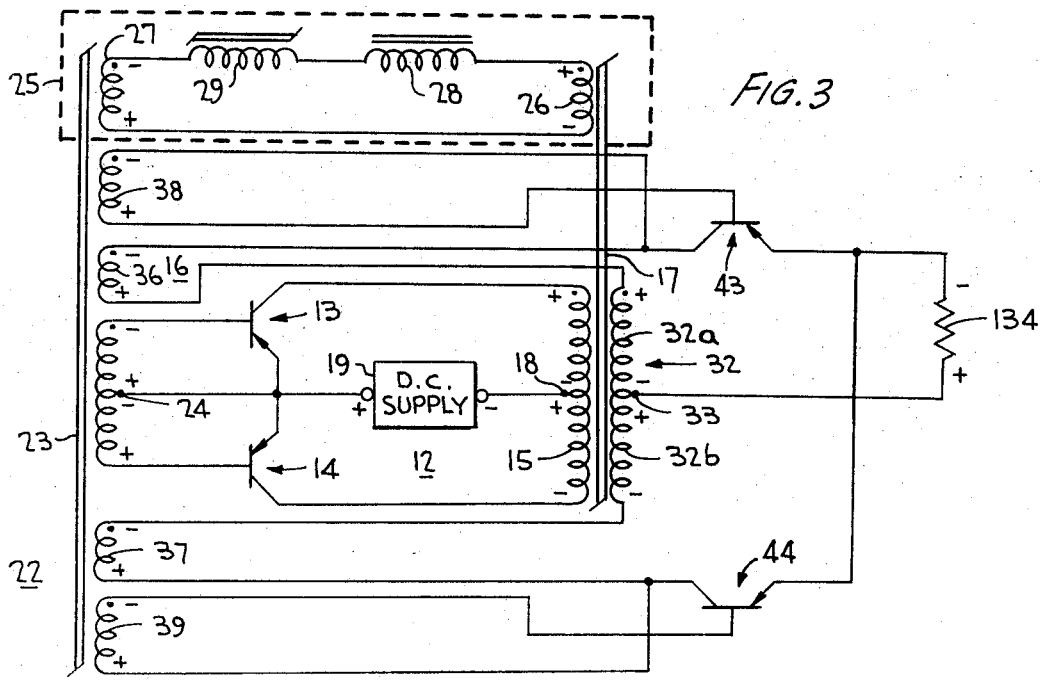
FIGS. 3-5 are circuit diagrams of alternate embodiments of the present invention.

FIG. 3 discloses another embodiment of the invention so that the DC voltage developed across load resistance 134 can be reversed in polarity relative to the circuit of FIG. 1. In particular, synchronous rectifier transistors 34 and 35 can be replaced with PNP transistors 43 and 44 in the manner illustrated in FIG. 3 wherein the emitter electrodes of transistors 43 and 44 are connected together to one side of load 134, the other side of which remains tied to center tap 33. Bias voltage is applied across the bases and collectors of transistors 43 and 44 by reversing the connections between windings 38 and 39 and these electrodes. The relative directions of the windings 38 and 39 on transformer 22 are not changed from that of FIG. 1, whereby transistor 43 is activated to an on condition simultaneously with transistor 14, while transistors 13 and 44 are cut off. During the alternate half cycle, transistors 13 and 44 are simultaneously conducting while transistors 14 and 43 are cut off.

Figure 4:
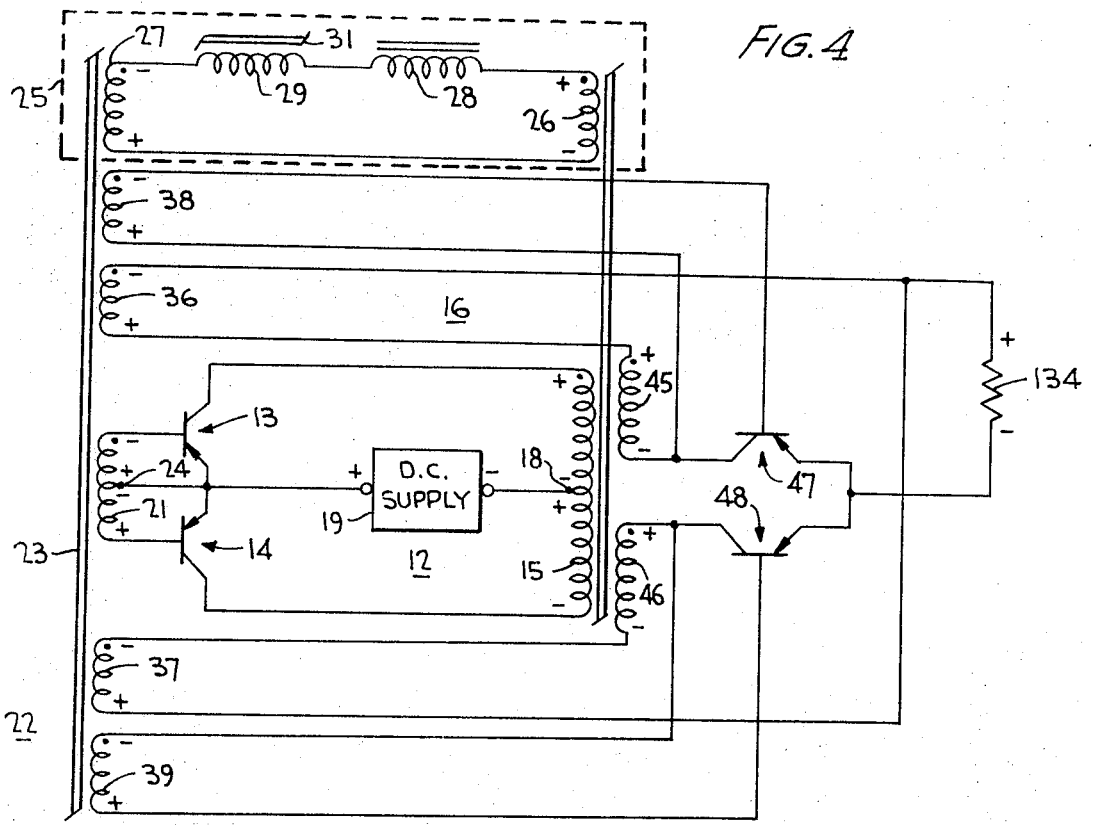
Figure 5:
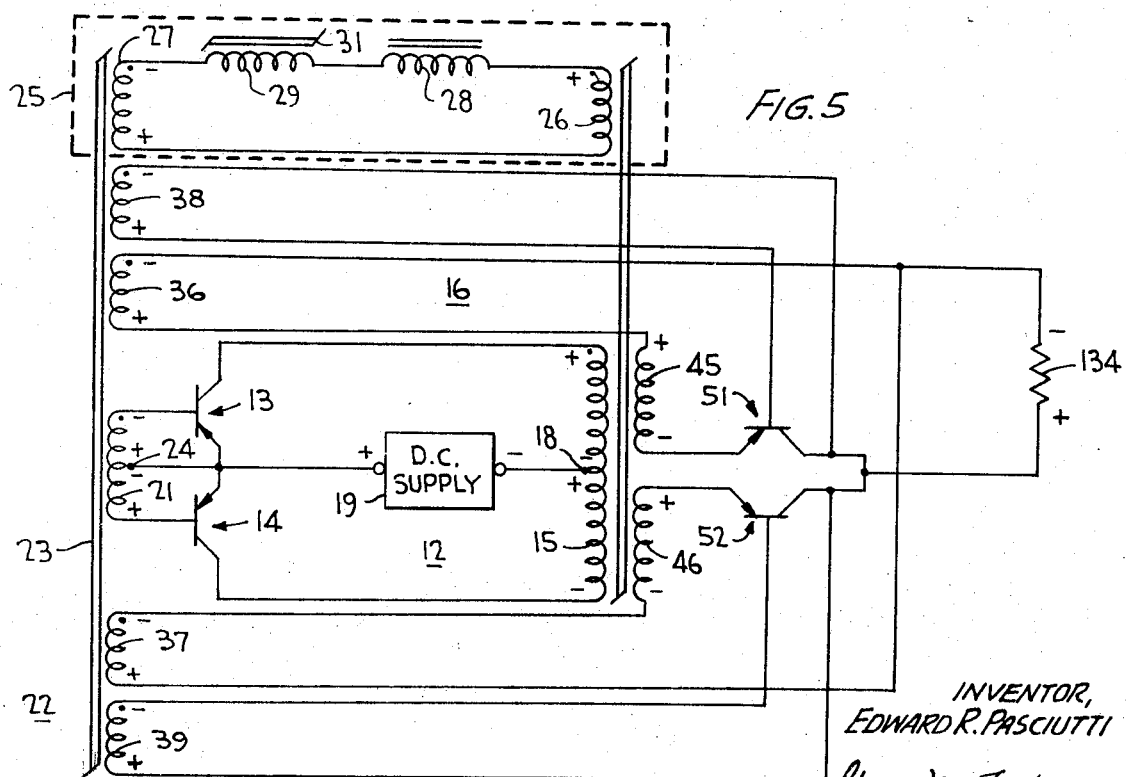

According to further modifications of the invention, illustrated in FIGS. 4 and 5, the secondary winding of transformer 16 is split into a pair of segments 45 and 46 each having the same number of turns. Winding segments 45 and 46 are wound in the same direction, with the outer ends connected to windings 36 and 37 in the same manner described with regard to FIG. 1. The inner ends of windings 45 and 46, however, are connected to the emitter collector paths of synchronous rectifier transistor switches.

According to the modification illustrated in FIG. 4, the collectors of PNP switching transistors 47 and 48 are connected to the inner ends of windings 45 and 46, respectively, and the emitters of transistors 47 and 48 are tied together to one end of load 134. The other end of load 134 is connected to opposite ends of transformer windings 36 and 37. To bias transistors 13 and 47 into the same conducting state simultaneously, the base of transistor 47 is connected to the dotted end of winding 38, while the transistor collector is connected to the undotted end of the winding. In contrast, the dotted end of winding 39 is connected to the collector of transistor 48 while the undotted end of the winding is connected to the transistor base. The connection arrangement illustrated in FIG. 4 results in positive current being supplied to the upper end of load 134 during each half cycle.

To reverse the polarity across load 134 so that the upper end thereof is supplied with negative current during each half cycle, the circuit configuration of FIG. 5 can be employed. In FIG. 5, PNP transistors 47 and 48 are replaced with PNP transistors 51 and 52, respectively. The emitters of transistors 51 and 52 are connected to the inner ends of windings 45 and 46, while the transistor collectors are tied together to the positive terminal of load 134. The base of transistor 51 is connected to the undotted end of winding 38, while the collector of the transistor is connected to the dotted end of the winding, whereby transistors 51 and 14 simultaneously conduct during alternate half cycles of the inverter. Bias between the collector and base of transistor 52 is established by connecting the transistor base to the dotted end of winding 39, while the collector of the transistor is connected to the undotted end of the winding. Thereby, transistors 13 and 52 simultaneously conduct during alternate half cycles to feed positive current to the lower end of load 134.

In all four embodiments the current waveforms of FIG. 2 are supplied to the switching transistors of the inverter and the synchronous rectifier. Thereby, in each, instance, switching is accomplished at a rapid rate while substantially precluding overlap conduction of the synchronous rectifier transistor switches while obtaining the advantage of their lower saturation resistance.

While there have been described and illustrated several specific embodiments of the invention, it will be clear that variations in the details of the embodiments specifically illustrated and described may be made without departing from the true spirit and scope of the invention as defined in the appended claims.

I claim:

1. In combination with a DC to AC inverter including, a pair of transistors driving a first transformer having a core, positive feedback means for coupling said first transformer to a second transformer driving said pair of transistors alternately into and out of conduction, said means for coupling including a frequency determining circuit including a saturable reactor and an inductor, whereby there is derived in a secondary winding of the second transformer a periodic waveform, said waveform including, during each period thereof, first, second and third relatively steep transitions, said first and second transitions following each other in rapid succession, said second and third transitions being directed in the same direction opposite from that of the first transitions, said second and third transitions being followed by a relatively flat wave segment, the flat wave segment following the third transitions being in turn followed by the first transition, means coupling replicas of said waveform to base electrodes of said transistors to drive the transistors in push-pull relationship; an AC to DC synchronous rectifier for feeding power from the first transformer to a load, the improvement comprising:

a pair of transistors forming synchronous switch means in said rectifier, each transistor of said switch means having base electrode control means and an emitter collector path for feeding power from the first transformer means to the load, means coupled to secondary winding means of said second transformer for driving said base electrodes of each transistor of the switch means with replicas of said periodic waveforms, the replicas driving the base electrodes of the transistor of the switch means being displaced by 180°, whereby the first transitions have a tendency to drive nonconducting transistors of the inverter and switch means to a conducting state, and the third transitions and the following flat wave segments cut off conducting transistors of the inverter and switch means without overlap.

2. The combination of claim 1 wherein said means coupled to secondary winding means of said second transformer for driving said control means comprises a pair of windings driving said base electrodes of said pair of rectifier transistor switches with replicas of said periodic waveform that are 180° phase displaced.

3. The combination of claim 2 wherein the means for driving the control means is connected between the base and collector of the rectifier transistors to supply bias between the base and collector of the rectifier transistors.

4. The combination of claim 2 wherein the second transformer includes first and second separate winding means, the first winding means being connected between emitter and base electrodes of the inverter transistors, the second winding means being connected between base and collector electrodes of the rectifier transistors.

5. The combination of claim 3 wherein the first transformer includes power output winding means and the second transformer includes third winding means, means connecting the output winding means and third winding means in series with the rectifier transistor means emitter collector path.

6. The combination of claim 1 wherein the first transformer includes a power output winding having first and second segments, the emitter collector paths of different rectifier transistors being connected in series between different ones of the winding segments and a load.

7. The combination of claim 6 wherein the different segments have a common connection with one terminal of the load and similar electrodes of the different rectifier transistors have a common connection with another terminal of the load.

8. The combination of claim 6 wherein the different segments are split, one end of each split segment being connected to a similar electrode of the different rectifier transistors, the second transformer including winding means connected with the other ends of the split segments.

9. In combination with a DC to AC inverter including, a pair of transistors driving a first transformer having a core, positive feedback means for coupling said first transformer to a second transformer driving said pair of transistors alternately into and out of conduction, whereby there is derived in a secondary winding of the second transformer a periodic waveform, means coupling replicas of said waveform to said transistors to drive base electrodes of the transistors in push-pull relationship, an AC to DC rectifier for feeding power from the first transformer to a load, the improvement comprising:

a pair of synchronous transistor switch means in said rectifier, each of said transistor switch means having a base electrode and an emitter collector path for feeding power from the first transformer means to the load, and means coupled to secondary winding means of said second transformer for driving said base electrodes with replicas of said periodic waveforms, the replicas driving the base electrodes of the transistor switch means being displaced in phase 180°.

10. The combination of claim 1 wherein the first transformer includes power output winding means and the second transformer includes third winding means, means connecting the output winding means and third winding means in series with the rectifier transistor means emitter collector path.

11. In combination with a DC to AC inverter including, a pair of transistors driving a first transformer having a core, positive feedback means for coupling said first transformer to a second transformer driving said pair of transistors alternately into and out of conduction, whereby there is derived in a secondary winding of the second transformer a periodic waveform, means coupling replicas of said waveform to said transistors to drive base electrodes of the transistors in push-pull relationship; an AC to DC rectifier for feeding power from the first transformer to a load, the improvement comprising:

a pair of synchronous transistor switch means in said rectifier, each of said transistor switch means having a base electrode and an emitter collector path for feeding power from the first transformer means to the load, means for connecting the emitter collector paths with the first transformer means and the load so that the currents in the paths increase with increases in the current supplied by the first transformer to the load, means coupled to secondary winding means of said second transformer for driving said base electrodes with replicas of said periodic waveforms, the replicas driving the base electrodes of the transistor switch means being displaced in phase 180°, said replicas applied to the base electrodes of the transistor switch means being such that the transistors of the switch means are forward biased to a greater extent with increases in the currents supplied through the emitter collector paths to the load.

* * * * *